UNITED STATES PATENT OFFICE.

MAXIMILIAN LEISEL, OF COLOGNE, GERMANY.

SOLDERING-PASTE.

No. 804,664.  Specification of Letters Patent.  Patented Nov. 14, 1905.

Application filed July 2, 1904. Serial No. 215,099.

*To all whom it may concern:*

Be it known that I, MAXIMILIAN LEISEL, a subject of the German Emperor, and a resident of Cologne-on-the-Rhine, Germany, have invented a new and Improved Soldering-Paste, of which the following is a full, clear, and exact description.

The soldering of metals is, as a rule, effected by applying a soldering medium or flux on the place to be soldered in order to remove any oxids possibly present or to prevent the formation of the same, after which the solder is usually applied with a soldering-iron or the like and melted, the said medium or flux enabling the solder to flow in the desired manner. As a flux or soldering medium in the case of soft-soldering an aqueous solution of ammonium chlorid, zinc chlorid, or zinc ammonium chlorid is employed and in the case of hard-soldering borax, water-glass, glass-powder, or the like.

In order to produce finer solderings, the solder is employed in the form of foil or powder alone or directly mixed with the fluxes or soldering mediums mentioned above.

Soldering, for example, with ammonium chlorid or zinc-ammonium-chlorid solution—the so-called "soldering-water" or "soldering solution"—has been found in practice to possess the defect that the soldered places or seams become defective in the course of time on account of the formation of residues which are difficult to remove and that during soldering round spots or stains arise which can only be removed by corrosion, by biting with acids, or the like and that long joints or seams to be soldered cannot be soldered without a renewal of the soldering-water. The reason of all these defects is that the water of the soldering water or solution evaporates more quickly than the soldering metal is melted, so that the soldering medium becomes dry before the solder is melted, whereby the formation of oxid is especially produced, the flow of the solder is impaired, and the soldered joint subsequently becomes defective. Consequently in electrical engineering soldering with soldering mediums has for some years been prohibited, and in Germany soldering with resin and tin has become the general practice in order to obtain durable solderings, although such a process is always troublesome. In order to perform this method of working as economically as possible, solder sticks have been produced which consist of a hard homogeneous mixture of resin and particles of tin solder with or without the addition of another soldering medium or flux, such as sal-ammoniac, for example. With such a solder stick, however, very fine solderings or the soldering of places accessible only with very great difficulty naturally cannot be effected, and losses in the soldering materials cannot easily be avoided.

All the defects mentioned above in connection with the well-known soldering processes are avoided by the soldering-paste material according to the present invention, which allows also employing even ammonium chlorid in solution for solderings, which are free from objection, and besides the customary soldering metals such metals as hitherto have not been applicable for soldering purposes and have been unknown for this purpose.

The soldering material according to the present invention consists, essentially, of such metals as can be converted into an extremely fine metal powder—particularly, for example, by reduction into dust by electrolysis or by mechanical means, such as blasting or the like. Such metals are, for instance, bismuth, tin, lead, zinc, antimony, brass, copper, nickel, aluminium, silver, gold, cobalt, iron, bronze, and so on, or their alloys. In order to prevent the oxidation of such metal powder or dust, such finely-divided metal being, as is well known, very readily oxidized, the metal powder according to the present invention is surrounded or enveloped with a fluid soldering medium or flux which remains fluid until use and until the metal solder or the soldering salt or substance in the same is melted—that is to say, the said soldering medium does not evaporate before use and before the metal solder or the added soldering salt or flux (for example, borax) is melted—so that the fine soldering-powder is surrounded by a fluid material until it is melted. As an especially advantageous material, whether soft or hard soldering material is to be manufactured, may be mentioned a solution of an acid-free soldering salt, such as ammonium chlorid or borax, water-glass, or the like in glycerin. According to the quantity of the said solutions employed the soldering material of the present process forms a more or less stiff paste. The action of the same is as follows:

If the present soldering-paste consists of soft-solder powder, (tin or the like,) ammonium chlorid, and glycerin, the glycerin does not evaporate before the solder is melted, as it possesses a boiling-point which is higher than the melting-point of the soldering metal, so that the solder remains surrounded by the fluid soldering medium or flux and is protected from oxidation until it is melted. Also the added soldering salt does not become dried up before the solder is melted, so that a renewal of the soldering medium or flux when soldering long joints is not necessary, as the formation of oxids on the place to be soldered is prevented, and consequently the flow of the solder is not impaired. Such a paste can also consist of a suitable metal powder impregnated with a solution of colophonium in oils or the like.

If the soldering-paste, for example, consists of a hard-soldering metal, a flux, such as borax, and glycerin, the glycerin does not evaporate before the borax is melted, which in the melted condition in its turn surrounds the metal powder and protects the same from oxidation until said powder is melted.

The present soldering-paste possesses, in addition to the advantages previously mentioned, the further advantages that it works not only perfectly uninjuriously and leaves behind no after effects—such as are left, for example, by soldering materials prepared with aqueous ammonium chlorid or zinc-chlorid solutions—but that places accessible only with very great difficulty and joints of any length can be soldered with it without a renewal of the soldering medium or flux being requisite, as is customary. Moreover, it leaves behind no black or dark spots or stains which after the soldering process must be removed by corrosion, biting with acids, or the like, and it permits the finest cracks, fractures, and chinks and the like to be filled up, and it can be applied in the thinnest layers. Further, it possesses the additional advantage that it is perfectly permanent, does not dry up, and can be made as thin and fluid as desired by the addition of glycerin or even water. Also with a paste manufactured in this manner out of soft-soldering metal or alloy almost all metals can be soldered, in particular such as hitherto it has been possible to solder only with difficulty.

By employing the metal solder in an extremely finely divided condition only a slight amount of heat is requisite for soldering, as it can be melted in such a condition much more easily and quickly. Also there is a saving in solder, as one need apply only the requisite amount, this being effected with a brush, the hand, or the like. In the case of soft-soldering the soldering can be effected with a simple spirit flame and is consequently so simple that soldering can be performed by the uninitiated without special practice. On account of these qualities such a material also is very well suited for covering a metal with another metal—for example, for tinning or the like—or for the production of writing, drawings, and the like. Instead of the said glycerin other organic substances can also naturally be employed, in so far as they produce the intended effect, and consequently have a boiling-point which is higher than the melting-point of the soldering metal or of the soldering salt. Thus hydrocarbons, alcohols, &c., vaseline-oil, or other oils and fats, stearin, ceresin, and the like, or mixtures thereof, all boiling at a high temperature, can be employed. Corresponding pastes or material are then obtained, which can be worked into pastes by means of water, oil, and other diluting or dissolving means.

What I claim is—

1. The herein-described soldering-paste, consisting of a mixture of fine soldering metal dust and a solution in glycerin of an acid-free flux, which solution in heating leaves no acid residues, substantially as described.

2. The hereinbefore-described soldering-paste, consisting of finely-divided soldering metal, glycerin and a soldering flux free from acid, as described.

3. The hereinbefore-described soldering-paste, consisting of finely-divided soft-soldering metal, glycerin and a soldering flux free from acid, as described.

4. The herein-described soldering-paste consisting of a mixture of soft-soldering metal dust, glycerin, and an ammoniacal soldering salt.

In testimony whereof I have signed my name to this specification in the presence of two subscribing witnesses.

MAXIMILIAN LEISEL.

Witnesses:
JOH. SCHOLZ,
WILLIAM RUGGERS.